US008662116B2

(12) United States Patent
Dumont et al.

(10) Patent No.: US 8,662,116 B2
(45) Date of Patent: Mar. 4, 2014

(54) BOTTLE FOR DISPENSING A FLUID PRODUCT

(75) Inventors: Pierre Dumont, Dargnies (FR); Jacky Lasnier, Sainte Marguerite sur Duclair (FR); Jean-Luc Marcel Octau, Intraville (FR); Mohamed Elmeguenni, Le Treport (FR)

(73) Assignee: Rexam Dispensing Systems S.A.S. (FR)

( * ) Notice: Subject to any disclaimer, the term of this patent is extended or adjusted under 35 U.S.C. 154(b) by 76 days.

(21) Appl. No.: 13/486,559

(22) Filed: Jun. 1, 2012

(65) Prior Publication Data

US 2012/0312843 A1 Dec. 13, 2012

(30) Foreign Application Priority Data

Jun. 8, 2011 (FR) ..................................... 11 55007

(51) Int. Cl.
*B67C 3/02* (2006.01)
*B65D 88/54* (2006.01)
*G01F 11/00* (2006.01)

(52) U.S. Cl.
USPC ....................................... 141/113; 222/321.9

(58) Field of Classification Search
USPC ........... 222/321.1–321.9, 83; 141/19, 27, 113
See application file for complete search history.

(56) References Cited

U.S. PATENT DOCUMENTS 3,718,165 A * 2/1973 Grothoff ......................... 141/20
5,791,527 A * 8/1998 Giuffredi ................... 222/321.9
6,021,924 A * 2/2000 Suck et al. .................... 222/105
6,070,763 A * 6/2000 Gueret ............................ 222/95
7,243,821 B2 * 7/2007 Bougamont et al. ....... 222/321.5
2002/0057938 A1 * 5/2002 Gueret .......................... 401/125
2005/0056343 A1 * 3/2005 Gueret .......................... 141/349
2005/0081947 A1 * 4/2005 Fedeli ............................. 141/19
2005/0284891 A1 * 12/2005 Ramet et al. ............... 222/321.7
2009/0194191 A1 * 8/2009 Turgeman ........................ 141/18
2011/0297275 A1 * 12/2011 Farrar et al. ................... 141/113

FOREIGN PATENT DOCUMENTS

EP 0753351 A2 1/1997
WO 2010094963 A1 8/2010

OTHER PUBLICATIONS

French Search Report; Application No. FR 1155007; Issued: Nov. 21, 2011; 6 pages.

* cited by examiner

*Primary Examiner* — Paul R Durand
*Assistant Examiner* — Vishal Pancholi
(74) *Attorney, Agent, or Firm* — St. Onge Steward Johnston & Reens LLC

(57) ABSTRACT

A bottle for dispensing a fluid product including a body with a reservoir for the conditioning of the product and a device for sampling of the conditioned product mounted in a sealed manner on the body, the device for sampling including means of supplying with conditioned product which have an upstream orifice arranged in the reservoir, the body being provided with a filling valve of the reservoir, the reservoir being devoid of product and having an air depression which is arranged in order to be able to carry out the subsequent filling of the reservoir, the bottle further including an envelope mounted in the reservoir in order to compartmentalise the reservoir into an internal space wherein the upstream orifice is arranged and an external space, the valve including means for breaking the envelope during the filling of the reservoir in order to put into communication the external and internal spaces.

9 Claims, 2 Drawing Sheets

BOTTLE FOR DISPENSING A FLUID PRODUCT

CROSS-REFERENCE TO RELATED APPLICATIONS

The present application claims priority of French patent application No. 11 55007 filed on Jun. 8, 2011, the content of which is incorporated herein by reference.

FIELD OF THE INVENTION

The invention relates to a bottle for dispensing a fluid product, in particular liquid, for example a cosmetic care product, makeup or perfumery product, or a pharmaceutical product.

BACKGROUND OF THE INVENTION

The bottle for dispensing comprises a body wherein a reservoir for conditioning the product is formed, as well as a device for sampling the conditioned product which is mounted in a sealed manner on said body. In particular, the device for sampling can include a manually-actuated pump which is supplied with conditioned product, said pump being arranged to distribute the product under pressure, for example in the form of an aerosol.

The device for sampling comprises means of supplying with conditioned product, for example formed of a plunger tube, which has an upstream orifice arranged in the reservoir in order to allow for the sampling of the product to be dispensed.

In an application example, the bottles according to the invention allow for the dispensing of samples of product, in particular for a volume of product conditioned in the reservoir which is between 1 and 10 ml. In particular, the samples distributed as such can allow a customer to test the product, the bottles then being qualified as sample test bottles. Alternatively, the bottles can be said to be "travel size" in that they make it possible to easily transport a reduced volume of product, as opposed to bottles of a higher capacity which are in general heavy and cumbersome as they are complete.

In these applications, for example for reasons of logistics, practicality or environmental reasons concerning recycling, it may be desirable to be able to refill the reservoir with product using a source of said product. Indeed, it is not very practical for a user to carry out the filling of the reservoir using a small funnel and it is not very ecological to discard an empty bottle in order to replace it with a full bottle constituting a refill.

Bottles for dispensing are already proposed for sale, wherein the body is provided with a filling valve of the reservoir which is arranged in order to allow for a putting into communication of a source of product with said reservoir. In particular, the valve can open via the pressing on the nozzle of the pump of a source bottle that is to be actuated several times in order to carry out the filling, which is a gesture that is not very intuitive for the user.

Bottles for dispensing have been proposed wherein the reservoir is devoid of product and which have an air depression that is arranged to be able to subsequently carry out the initial filling of the reservoir with product by the sealed putting into communication of a product source with said reservoir by the intermediary of a valve in such a way that said depression induces the filling of said reservoir through suction of the product contained in said source.

However, the problem arises of storage over time of the air depression in the reservoir. Indeed, devices for sampling are never perfectly sealed against microleakage as they include many zones for sealing via tightening and are comprised of plastic or elastomeric materials which, over time, become slightly porous to air.

SUMMARY OF THE INVENTION

The invention aims to improve prior art by proposing in particular a bottle for dispensing wherein an air depression in the reservoir can be stored during the storage of the bottle before its initial filling, in such a way as to make reliable the filling capacity via suction of said reservoir by the sealed putting into communication of a product source with said reservoir.

To this effect, the invention proposes a bottle for dispensing a fluid product comprising a body wherein a reservoir intended for the conditioning of said product is formed, said bottle further comprising a device for sampling said conditioned product which is mounted in a sealed manner on said body, said device for sampling comprising means of supplying with conditioned product which has an upstream orifice arranged in the reservoir, said body being equipped with a filling valve of said reservoir which is arranged in order to allow for the putting into communication of a product source with said reservoir, the reservoir being devoid of product and having an air depression which is arranged in order to be able to carry out the subsequent filling of the reservoir with product by the sealed putting into communication of a product source with said reservoir by the intermediary of the valve in such a way that said depression induces the filling of said reservoir through suction of the product contained in said source, said bottle further comprising an envelope mounted in the reservoir in order to compartmentalise said reservoir into an internal space wherein the upstream orifice is arranged and an external space, said valve comprising means for breaking said envelope during the filling of the reservoir in order to put into communication the external and internal spaces.

BRIEF DESCRIPTION OF THE DRAWINGS

Other purposes and advantages of the invention shall appear in the following description, made in reference to the annexed figures, wherein.

DETAILED DESCRIPTION OF THE INVENTION

Figure 1A:
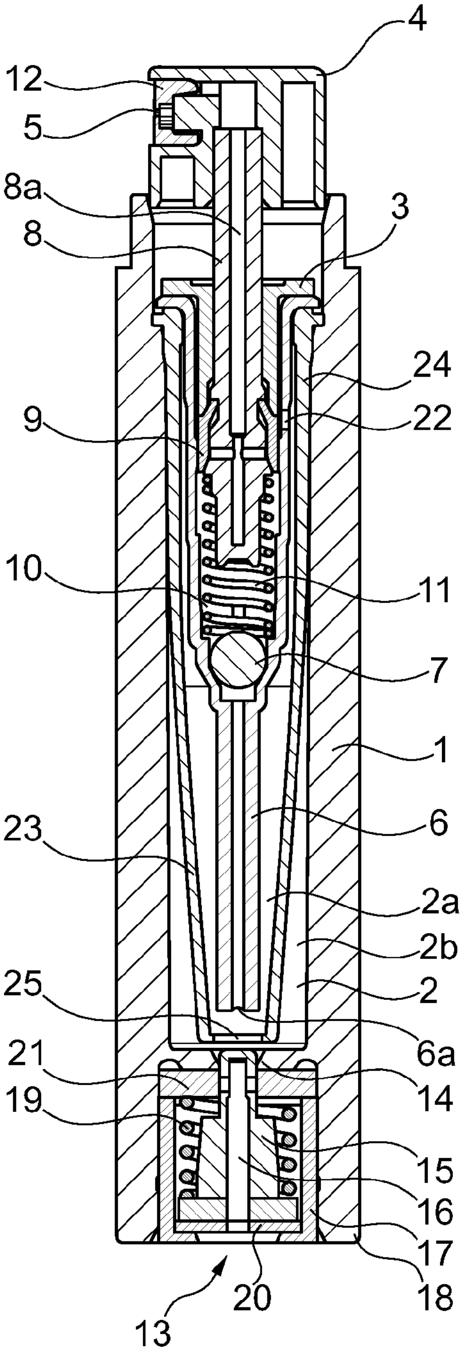
FIG. 1*a* shows as a longitudinal section a bottle for dispensing according to an embodiment of the invention in a storage state.

In the description, the terms of positioning in space are taken in reference to the position of the bottle shown in the figures.

In relation with the figures, hereinbelow is described a bottle intended to contain a fluid product to be dispensed. In particular examples, the product can be liquid, in particular a cosmetic care product, makeup or perfumery product, or a pharmaceutical product.

The bottle comprises a body 1 wherein a reservoir 2 for conditioning the product is formed. According to a particular application, the reservoir 2 can have a capacity between 1 and 10 ml in such a way as to allow for the dispensing of product samples.

In the embodiments shown, the body 1 is rigid, in particular having a rigidity that is sufficient for the volume of the reservoir 2 to remain substantially constant. The body 1 can be of a single piece, for example made via air-blow injection or air-blown extrusion, or from several injected and then assembled parts, for example via ultrasonic welding or via rotating friction, from rigid plastic material, from metal, for example from aluminium, or from glass. In an alternative not shown, the body 1 can be flexible, in particular deformable during the dispensing of the product.

The bottle comprises a device for sampling 3 the conditioned product which is mounted in a sealed manner on the body 1, in particular in the upper opening of said body. The device for sampling 3 is provided with a push-button 4 which is provided with a dispensing orifice 5 for said product, said push-button able to be displaced reversibly on an actuating stroke of said device between a position at rest and a depressed position wherein the dispensing orifice 5 is in communication with the reservoir 2 by the intermediary of said device.

The device for sampling 3 comprises means of supplying with conditioned product which, in the figures, include a plunger tube 6 arranged in the reservoir 2, said tube having an upstream orifice 6*a* arranged in the reservoir 2. Moreover, the plunger tube 6 has a downstream orifice provided with an inlet valve 7 of the product in the device for sampling 3.

In the embodiments shown, the device for sampling comprises a dispensing pump 3 actuated manually by means of a push-button 4 which is supplied with the product under pressure with the purpose of dispensing it. The push-button 4 is mounted on the nozzle 8 of the pump 3 by placing the dispensing orifice 5 in communication with an outlet channel 8*a* of said nozzle.

The pump 3 further comprises a piston 9 mounted around the nozzle 8 in order to delimit a metering chamber 10, said nozzle able to be displaced reversibly over a dispensing stroke—respectively for suction—wherein the piston 9 opens—respectively closes—the communication between the outlet channel 8*a* and the metering chamber 10.

The push-button 4 comprises an upper zone allowing the user to exert pressure with a finger on said push-button in order to be able to displace the nozzle 8 on its dispensing stroke to a depressed position of said push-button, the return of the push-button 4 to the position of rest on the suction stroke of the nozzle 8 being conventionally carried out by a spring 11.

The push-button 4 is provided with a spray nozzle 12 which is arranged to radially distribute an aerosol of the product through the dispensing orifice 5. However, the invention is not limited to a particular method for dispensing the product. In particular, especially for a nasal spray tip, the push-button 4 can allow for an axial dispensing of the product and another type of device for sampling 3 can be considered.

The body 1 of the bottle is provided with a filling valve 13 of the reservoir 2 which is arranged in order to allow for the putting into communication of a product source with said reservoir. The product source can include a source reservoir whereon is arranged an outlet tube, with the filling of the product of the reservoir 2 being carried out by mounting said tube bearing in a sealed manner on the valve 13 which is arranged to be opened in a reversible manner.

In particular, a feed bottle of a higher capacity can be used as a source of product, said bottle being provided with a pump of which the push-button is removed in order to allow for the arrangement of the nozzle bearing in a sealed manner on the valve 13. Indeed, in addition to the opening of the valve 13, the bearing in a sealed manner causes the opening of the pump in order to allow for the passage of the filling product through it.

According to another embodiment, the reservoir source is formed inside a flexible pocket which can be filled with product without air or gas for the good preservation of said product. The transfer of the product in the reservoir 2 is then possible in all positions and the flexible pocket cannot be diverted from its role as a source since without propulsion gas or internal pressure, or push-button to actuate a possible pump or valve associated to the outlet tube.

In the embodiments shown, the filling valve 13 is arranged on the lower end of the body 1, in such a way in particular as to fill the reservoir 2 via the bottom of the bottle, which corresponds to an intuitive gesture.

To do this, the lower end of the body 1 has a communication orifice 14 with the reservoir 2 and the valve 13 comprises a nozzle 15 which is mobile between a stable sealed closing position of the orifice 14 of the reservoir and a constrained filling position of said reservoir via the opening of said orifice.

In relation with the figures, the nozzle 15 is provided with an internal channel 16, said nozzle being mounted in translation in a ring 17 which is fixed in a sealed manner in a cage 18 formed under the body 1. The valve 13 further comprises a return spring 19 of the nozzle 15 in closed position and two respectively external 20 and internal 21 seals in order to seal the mounting of the nozzle 15 in the ring 17 and the putting into communication of the product source on said nozzle.

The reservoir 2 is devoid of product and has an air depression which is arranged to be able to carry out the subsequent filling of said reservoir with product by putting into a sealed communication of the product source with said reservoir by the intermediary of the valve 13 in such a way that said depression induces the filling of said reservoir through suction of the product contained in said source. In particular, the air depression can be of a magnitude of −980 hPa.

The device for sampling 3 can be of the airless type in the conditioning reservoir 2 as compensation for the volume of the product distributed in order to allow for subsequent fillings or with air in order to limit the use of the bottle to a single filling. In the embodiments shown, the pump 3 has a vent hole 22 that is arranged in order to make it possible to compensate for the volume of product sampled in the reservoir 2 by air.

The bottle further comprises an envelope 23 mounted in the reservoir 2 in order to compartmentalise said reservoir into an internal space 2*a* wherein the upstream orifice 6*a* is arranged and an external space 2*b*. As such, during the storage and before the first filling via suction, the device for sampling 3 is in communication only with the internal space 2*a*, which limits to this space any leakages of air passing through the interior of said device, and the sealing of the external space 2*b* is independent of that of the device for sampling 3 which makes it possible to guarantee this more easily.

The valve 13 comprises means for breaking the envelope 23 during the filling of the reservoir 2 in order to put into communication the external 2*b* and internal 2*a* spaces. As such, the filling of the entire reservoir 2 can be carried out via suction and the conditioned product in said reservoir can be sampled by the intermediary of the upstream orifice 6*a* during the actuation of the device for sampling 3.

Advantageously, the external space 2*b* can have a volume which is greater than that of the internal space 2*a*, for example of a magnitude of 2 to 5 times greater, in such a way that a possible leakage of air in the internal space 2*a* can be diluted in the external space 2*b* during the breaking of the envelope 23. As such, even in the case of a leak on the device for sampling 3, the filling capacity of the reservoir 2 via suction is only slightly affected.

In particular, the internal 2*a* and external 2*b* spaces can each have an initial air depression, said depression able to be obtained by assembling the bottle in a vacuum chamber. Alternatively, in particular when the internal space 2*a* has a volume that is negligible in relation to that of the external space 2*b*, only said external space can have an air depression.

In the embodiments shown, the envelope 23 has a neck 24 which is fixed in a sealed manner between the body 1 and the device for sampling 3, said envelope coming to cover the vent hole 22 so that the latter is in communication with the internal space 2*a*. Moreover, the envelope 23 has a bottom portion 25 which is arranged opposite the nozzle 15, said nozzle protruding into the external space 2*b* in filling position in order to allow for the breaking of said bottom by arrangement of said nozzle in said position.

In this embodiment, the envelope 23 fully surrounds the device for sampling 3 in the reservoir 2. Alternatively, only a portion of the device for sampling 3 can be covered by the envelope 23, in particular only the plunger tube 6 or even solely the upstream orifice 6*a* in order to form the internal space 2*a* inside the device for sampling 3.

Figure 1B:
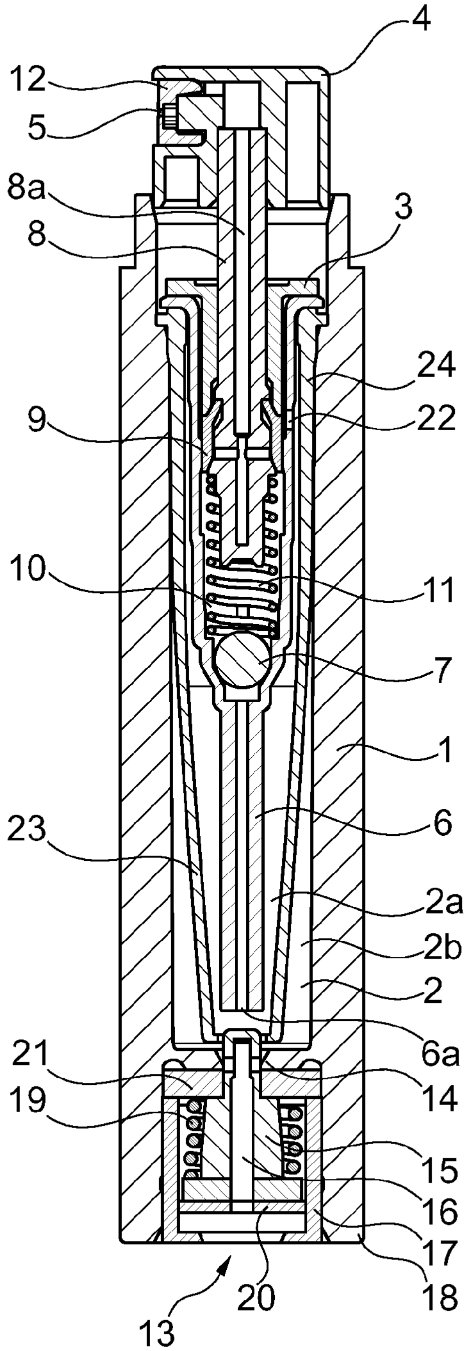
FIG. 1*b* shows as a longitudinal section a bottle for dispensing according to an embodiment of the invention in a filling state.

In relation with FIGS. 1*a* and 1*b*, the bottom 25 can be broken via interaction with the nozzle 15, in particular with the distal end of said nozzle which can have a support zone that improves its capacity to cut the bottom 25. Moreover, the bottom 25 can have pre-cuts of a pellet corresponding to the zone of interaction with the distal end of the nozzle 15.

Figure 2A:
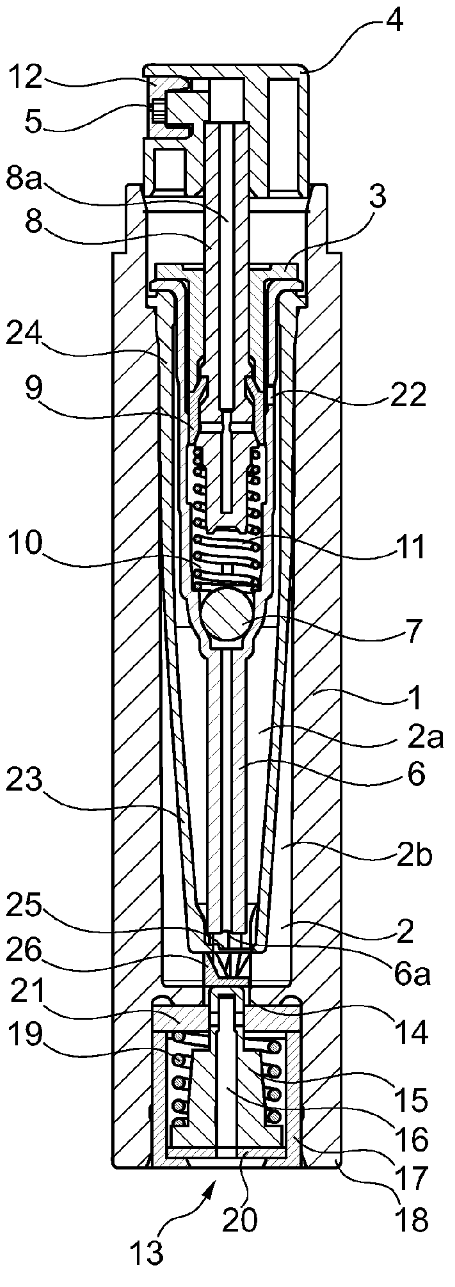
FIG. 2*a* shows as a longitudinal section a bottle for dispensing according to another embodiment of the invention in a storage state.
Figure 2B:
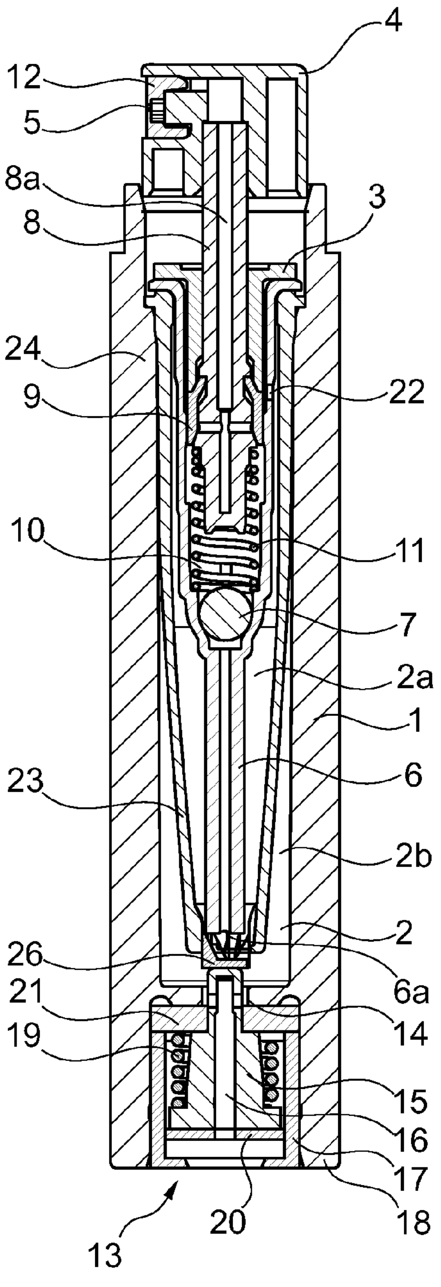
FIG. 2*b* shows as a longitudinal section a bottle for dispensing according to another embodiment of the invention in a filling state.

In relation with the FIGS. 2*a* and 2*b*, the nozzle 15 comprises means for perforating the bottom 25 of the envelope 23. More precisely, the distal and of the nozzle 15 carries claws 26 which, in filling position, come to pierce the bottom 25 in order to put into communication the internal 2*a* and external 2*b* spaces during the filling.

What is claimed is:

1. A bottle for dispensing a fluid product comprising a body wherein a reservoir intended for the conditioning of said product is formed, said bottle further comprising a device for sampling of said conditioned product which is mounted in a sealed manner on said body, said device for sampling comprising means of supplying with conditioned product which has an upstream orifice arranged in the reservoir, said body being equipped with a filling valve of said reservoir which is arranged in order to allow for the putting into communication of a product source with said reservoir, the reservoir being devoid of product and having an air depression which is arranged in order to be able to carry out the filling of the reservoir with product by putting into sealed communication of a product source with said reservoir by the intermediary of the valve in such a way that said depression induces the filling of said reservoir through suction of the product contained in said source, said bottle further comprising an envelope mounted in the reservoir in order to compartmentalise reservoir into an internal space wherein the upstream orifice is arranged and an external space, said valve comprising means for breaking said envelope during the filling of the reservoir in order to put into communication the external and internal spaces.

2. The bottle for dispensing according to claim 1, characterised in that the internal and external spaces each have an air depression.

3. The bottle for dispensing according to claim 1, characterised in that the external space has a volume which is greater than that of the internal space.

4. The bottle for dispensing according to claim 1, characterised in that the envelope has a neck which is fixed in a sealed manner between the body and the device for sampling.

5. The bottle for dispensing according to claim 1, characterised in that the valve comprises a nozzle which is mobile between a stable closing position of the reservoir and a constrained filling position wherein said nozzle is protruding into the external space, the envelope comprising a portion arranged opposite said nozzle in order to be broken by arrangement of said nozzle in the filling position.

6. The bottle for dispensing according to claim 5, characterised in that the portion of the envelope can be broken via interaction with the nozzle.

7. The bottle for dispensing according to claim 5, characterised in that the nozzle comprises means for perforating the portion of the envelope.

8. The bottle for dispensing according to claim 1, characterised in that the device for sampling is of the airless type in the reservoir for conditioning as compensation for the volume of product distributed.

9. The bottle for dispensing according to claim 1, characterised in that the device for sampling has a vent hole which is arranged in order to make it possible to compensate for the volume of product sampled in the reservoir by air, said vent hole being in communication with the internal space.

* * * * *